R. G. CLARKE.
GAME APPARATUS.
APPLICATION FILED MAR. 11, 1919.
1,320,315.
Patented Oct. 28, 1919.
2 SHEETS—SHEET 1.
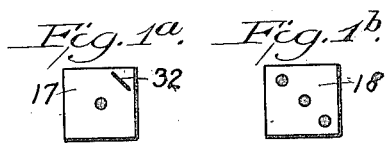
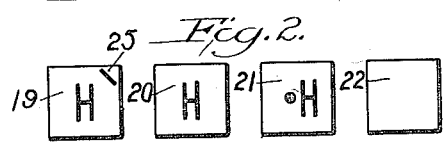
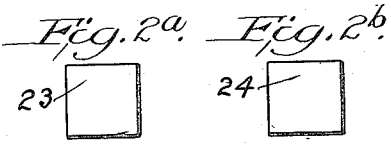
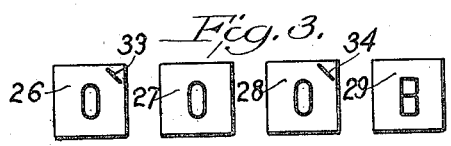
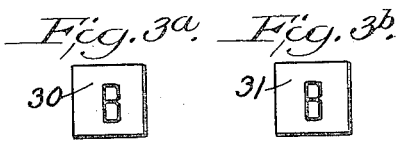
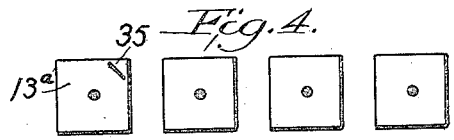
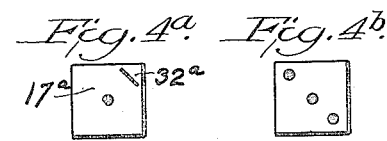
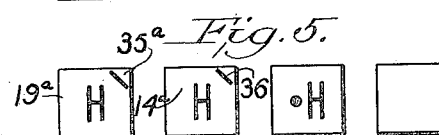
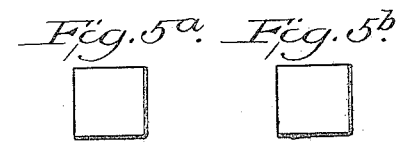
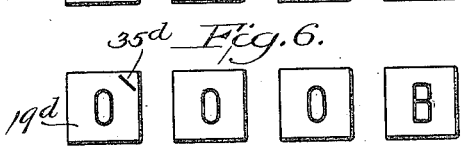
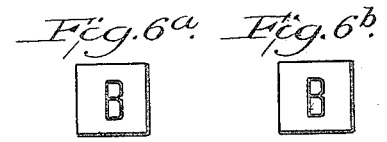
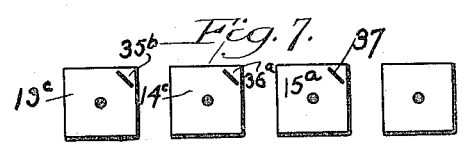
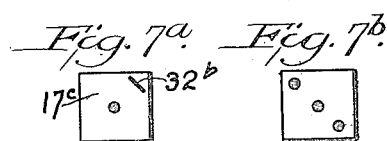
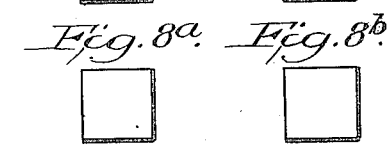
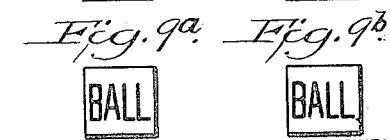
WITNESSES
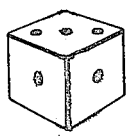
INVENTOR
R.G. CLARKE
BY
ATTORNEYS

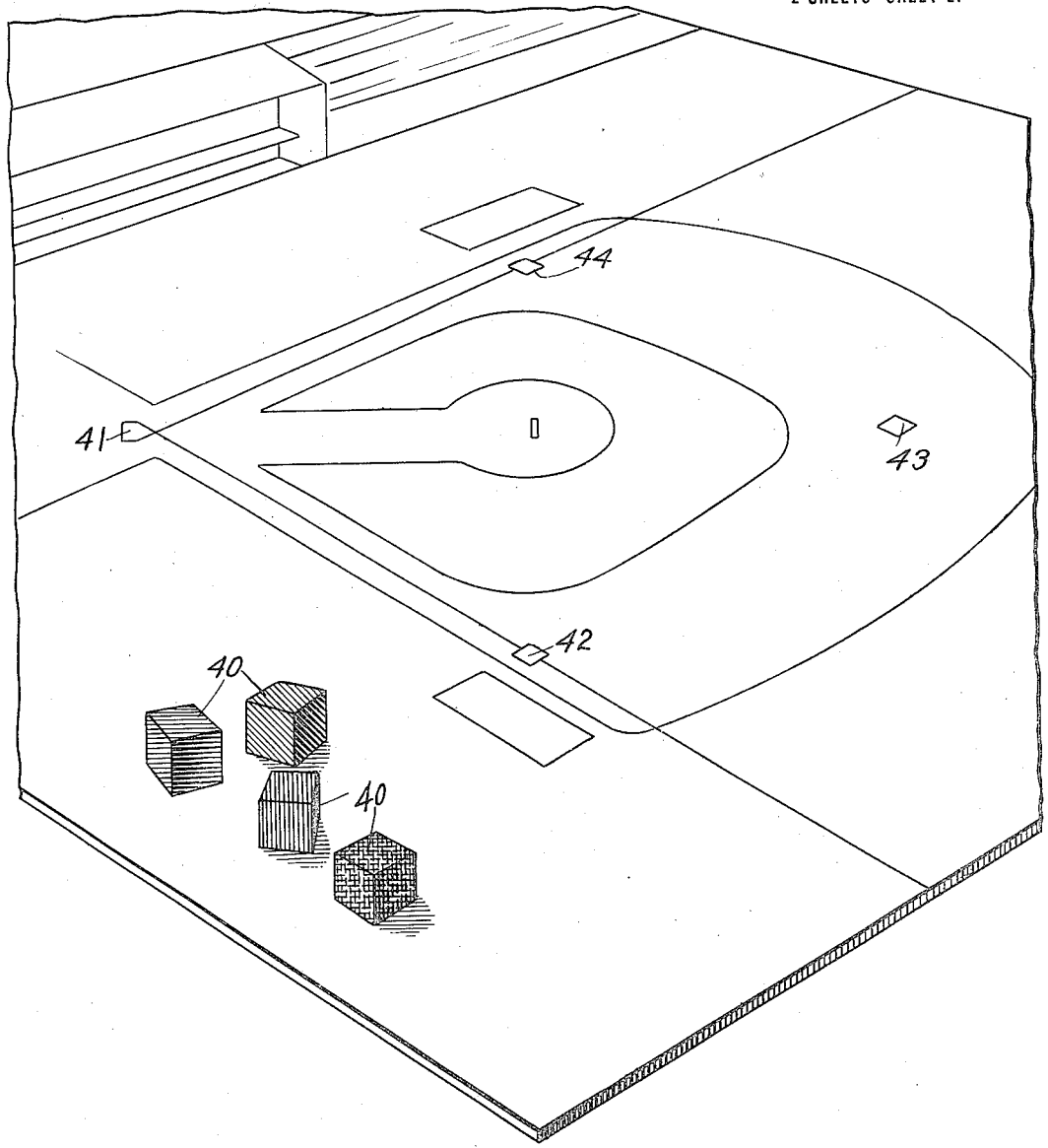

UNITED STATES PATENT OFFICE.

RICHARD G. CLARKE, OF NEW YORK, N. Y.

GAME APPARATUS.

1,320,315.

Specification of Letters Patent.  Patented Oct. 28, 1919.

Application filed March 11, 1919. Serial No. 281,909.

*To all whom it may concern:*

Be it known that I, RICHARD G. CLARKE, a citizen of the United States, and a resident of New York city, borough of Manhattan, in the county of New York and State of New York, have invented a new and Improved Game Apparatus, of which the following is a full, clear, and exact description.

My invention relates to games, and it has for its object to provide a new and interesting game apparatus, known as parlor baseball, the playing of which offers a source of amusement. In the playing of the game, the players may use their judgment, and it is not necessary to leave the outcome of the game entirely to chance.

Additional objects of the invention will appear in the following specification in which the preferred form of my invention is described.

In the drawings similar reference characters refer to similar parts in all the views, in which—

Figures 1, 1ª and 1ᵇ are views showing the sides of a game piece or die;

Figs. 2, 2ª and 2ᵇ are views showing the sides of another game piece or die;

Figs. 3, 3ª and 3ᵇ are views showing the sides of another game piece or die;

Figs. 4, 4ª and 4ᵇ are views showing the sides of another game piece or die;

Figs. 5, 5ª and 5ᵇ are views showing the sides of another game piece or die;

Figs. 6, 6ª and 6ᵇ are views showing the sides of another game piece or die;

Figs. 7, 7ª and 7ᵇ are views showing the sides of another game piece or die;

Figs. 8, 8ª and 8ᵇ are views showing the sides of another game piece or die;

Figs. 9, 9ª and 9ᵇ are views showing the sides of another game piece or die;

Fig. 10 is a perspective view showing one of the game pieces or dice; and

Fig. 11 is a perspective view showing a board on which the game may be played.

My invention consists of a series of sets of game pieces such as dice, which are marked in a new and distinctive manner, whereby they are rendered suitable for playing the game of parlor baseball. Rules for playing the game will be hereinafter set forth.

By referring to the drawings, it will be seen that a series of sets of game pieces are provided, there being preferably three game pieces in each set, and there being preferably three sets of game pieces. The three game pieces in one set are illustrated in Figs. 1, 1ª, 1ᵇ, 2, 2ª, 2ᵇ, 3, 3ª and 3ᵇ. The three game pieces in the second set are illustrated in Figs. 4, 4ª, 4ᵇ, 5, 5ª, 5ᵇ, 6, 6ª and 6ᵇ. The game pieces in the third set are illustrated in Figs. 7, 7ª, 7ᵇ, 8, 8ª, and 8ᵇ, 9, 9ª and 9ᵇ.

The game piece illustrated in Figs. 1, 1ª and 1ᵇ, has six sides, as shown in the drawings, and the sides 13, 14, 15 and 16, which extend continuously around the game piece or die in one direction, are each provided with a dot, the fifth side indicated at 17 having a dot and a dash at the corner, and the sixth side indicated at 18 having three dots as illustrated in Fig. 1ᵇ.

The second game piece in the first set has its sides 19, 20, 21 and 22 extending around in one direction, and has the letter H indicating a hit on each of the sides 19, 20 and 21; 21 being also provided with a dot; its fourth side 22 being left blank and its fifth and sixth sides 23 and 24 also being blank. The side 19 on which there is an H, is also provided with a dash, shown at 25. The sides 26, 27 and 28 have each indicated thereon the letter O, indicating out; the fourth side 29 having a B indicating Ball and a B on the sides 30 and 31. The markings with the exception of the dash 25 and the dash 32 on the side 17 in Fig. 1ª are the principal markings, and these principal markings appear on the three game pieces or dice in the second set indicated in Figs. 4, 4ª, 4ᵇ, 5, 5ª, 5ᵇ, 6, 6ª and 6ᵇ, and also on the game pieces or dice in the third set shown at Figs. 7, 7ª, 7ᵇ, 8, 8ª, 8ᵇ, 9, 9ª and 9ᵇ. In other words, the principal markings on the corresponding game pieces or dice in the second and third sets correspond with the principal markings on the game pieces or dice in the first set; the game pieces or dice in the second and third sets being distinguishable from each other, and from the game pieces or dice in the first set by the supplementary markings, two of which are shown in the first set at 25 and 32.

There are additional supplementary markings in the first set shown in Fig. 3 of the drawings and indicated at 33 and 34. All these supplementary markings 25, 32, 33 and 34 are dashes in the corners of surfaces of the game pieces or dice. In the game piece illustrated in Figs. 4, 4$^a$ and 4$^b$, in the second set, there is a supplementary marking 35 in the face 13$^a$ of the game piece or die, and there is a supplementary marking 32$^a$ in the face 17$^a$ of the game piece or die. In the game piece or die shown in Figs. 5, 5$^a$ and 5$^b$, there is a supplementary marking 35$^a$ in the face 19$^a$ of the game piece or die, and there is a supplementary marking 36 in the face 14$^a$ of the said game piece or die. In the game piece or die illustrated in Figs. 6, 6$^a$ and 6$^b$, there is a supplementary marking 35$^d$ in the face 19$^d$ of the game piece. In the game piece or die illustrated in Figs. 7, 7$^a$ and 7$^b$, there is a supplementary marking 35$^b$ in the face 13$^c$ of the game piece or die. There is a supplementary marking 36$^a$ in the face 14$^c$; there is a supplementary marking 37 in the face 15$^a$; there is a supplementary marking 32$^b$ in the face 17$^c$; there is a supplementary marking 35$^c$ in the face 19$^b$ of the game piece or die illustrated in Figs. 8, 8$^a$ and 8$^b$; there is also a supplementary marking 33$^a$ in the face 26$^a$ in the game piece or die illustrated in Figs. 9, 9$^a$ and 9$^b$.

As has been stated, I provide a series of sets of game pieces or dice. The drawings show a series of three sets with three game pieces or dice, in each set of the series. Of course, it will be understood that while I have shown in the drawings the game pieces or dice hexagonal in shape, it will be understood that the game pieces or dice may be constructed with any predetermined number of sides.

It will be seen that one set of the game pieces is shown in Figs. 1, 1$^a$, 1$^b$, 2, 2$^a$, 2$^b$, 3, 3$^a$ and 3$^b$. A second set is shown in Figs. 4, 4$^a$, 4$^b$, 5, 5$^a$, 5$^b$, 6, 6$^a$, and 6$^b$, and a third set is shown in Figs. 7, 7$^a$, 7$^b$, 8, 8$^a$, 8$^b$, 9, 9$^a$ and 9$^b$. Each set of game pieces has a different arrangement of the coördinate indicia which distinguishes it from the game pieces or dice of the other sets. The coördinate indicia comprise two divisions, the primary division and the supplementary division; the supplementary division being indicated at 32, 25, 33, 34, 35, 32$^a$, 35$^a$, 35$^d$, 36, 35$^b$, 36$^a$, 37, 32$^b$, 35$^c$ and 33$^a$. The remaining coördinate indicia are the primary. The coördinate indicia are employed to indicate in the throw of the game pieces or dice the plays of the game and the opportunities for additional plays in the manner described in the rules which will hereinafter be set forth.

The coördinate indicia of the primary division are intended to represent plays based on the movement of the ball when it reaches the home plate from the pitcher. The coördinate indicia of the supplementary division are intended to represent the ball when thrown to one or more base men and refer to the action on the base runners. The supplementary coördinate indicia, not showing in certain throws, of the game pieces or dice, afford opportunities for certain double plays. The same indicia will, in certain of the throws, put the base runners out, and at times effect a double play, all of which is set forth in the rules of the game described to show the utility of the invention.

The object of having a number of sets of game pieces or dice, each set having a different arrangement of the coördinate indicia of the supplementary division which distinguishes the one set of game pieces or dice from the remaining sets of game pieces or dice, is to provide a group of pitchers, each set representing a pitcher of different ability, this being done as has been referred to by the method of varying the lines or supplementary coördinate indicia in each set, thereby increasing or decreasing the value of the play indicated by the upturned face of the game pieces or dice when they are thrown. It is obvious that certain changes may be made in the primary and supplementary coördinate indicia without departing from the spirit of this invention.

The game may be played by one or more players on each side. Four markers 40 are preferably employed which will represent the batter and the runners on the bases. The first side to bat may be chosen by the highest throw of the game pieces. The pitcher is selected by the fielding side, that is, one of the sets of game pieces referred to is selected by the side which is playing in the field, and one of the players on this side will throw the game pieces or dice, or, if preferred, will throw the game pieces or dice illustrated in Figs. 1, 1$^a$, 1$^b$, 3, 3$^a$ and 3$^b$, or the corresponding game pieces or dice in one of the other sets. If one of the players on the fielding side should throw only two game pieces or dice referred to, one of the players on the batting side will throw the game piece or die shown in Figs. 2, 2$^a$ and 2$^b$ or the corresponding game piece or die in one of the other sets. The throws and primary plays are the following:

1 dot, letter H or the word Hit, and letter B or the word Ball will refer to a one base ball hit called a single.

2 dots, letter H or the word Hit and the letter B or the word Ball will refer to a two base ball hit called a double.

3 dots, letter H or the word Hit and the letter B or the word Ball will refer to a three base ball hit called a triple.

4 dots, letter H or the word Hit and the letter B or the word Ball will refer to a four base ball hit called a home run.

1 dot, and letter B or the word Ball will refer to a called ball on the pitcher.

3 dots and letter B or the word Ball will refer to a foul ball.

1 dot and the letter O or the word Out will refer to a strike called on the batter.

3 dots and the letter O or the word Out will refer to a foul strike out, and the fact that the batter hit out on a foul.

Either 1, 2, 3, or 4 dots with the letter H or the word Hit and the letter O or the word Out will refer to the fact that the batter hit out.

The value of the plays referred to above are the same as in the outdoor game of baseball.

The plays referred to have reference to the pitcher on the fielding side and the batter at the plate, the movement of the base runners on the bases being regulated by the supplementary coördinate indicia which appear on the upturned faces of the game pieces or dice after they have been thrown. All base hits advance the runners the same number of bases that they advance the batters until they score at the home plate 41. The first base is indicated at 42, second base at 43 and third base at 44, but it will be understood that there is an exception where a "force" occurs. If the upturned faces of the dice show a one base hit in the manner set forth and also show two lines of supplementary coördinate indicia, that is a "force" and if there is a runner on first base to which the batter advances, the runner is forced to run and in turn may force other runners, the most advanced forced runner is put out and it will also be understood that under the said conditions, if the runner is not forced, he is not permitted to advance.

In stealing bases, a runner must show he is trying to steal a base by being off the base, that is, being advanced beyond one of the bases 42, 43 or 44, in order to have an opportunity to advance when the upturned faces of the game pieces or dice show he is entitled to advance if he is off the base. If the next base is vacant, the base runner may steal a base, that is, be advanced to the next base on any call ball not a fourth call ball. The player having the base runner may change his mind at any time and return his base runner, provided that an opponent player is not in the act of throwing the dice. A double steal is possible when no line appears on the upturned faces of the game pieces or dice when a ball is called, which is not a fourth call ball, and in such a case, a second runner who is off his base may steal to the next vacant base or to the base vacated by another base runner. The most advanced runner of those off bases is out when a strike is indicated, as has been set forth, by the throwing of the game pieces or dice which is not a third strike.

In addition to the first base runner, who is put out, the next most advanced base runner is also put out if there should be another off a base when the upturned game pieces or dice show a strike, not a third strike and two lines of the supplementary coördinate indicia. When any hit out, that is, where 1, 2, 3 or 4 dots appear together with the letter H or the word Hit and the letter O or the word Out and three lines of the supplementary coördinate indicia also show on the upturned faces of the game pieces or dice, puts out not only the batter but also the runner most advanced. This is so when the runner is off his base with the intention to steal or not off, it being understood he started to run when this hit was made.

The player having control of the base indicating the batter may declare his intention to attempt a sacrifice hit by moving his piece to the outside left of the home plate and state which base runner he wishes to advance one base. The runner may, of course, attempt to steal at the same time. In such a case all plays indicating a one baseball hit including force plays shall be deemed sacrifice hits, and the batter is out and the runner may advance to the next vacant base. It is understood that no sacrifice hit may be attempted in an inning in which two players have been put out, and it will also be understood that such a sacrifice play cannot be made when the next base to the runner is not vacant. The pitchers may change at the option of the players at the commencement of the fourth and seventh innings. Pitchers are changed by using a different set of game pieces or dice, and both sides may use the same set of game pieces or dice, if they desire.

As in the outdoor game of baseball, when three players are out, the sides exchange positions, that is, the side which has been at the bat goes to the field, and the side which has been playing the field, bats. Nine innings constitute a game as in the outdoor game of baseball, and when a tie occurs at the end of the ninth inning, the play continues until one side leads in runs on even innings. The highest score determines the winner.

When playing the game, the players will, of course, note how the desired plays have been averaging so that they may figure on the possibility of obtaining the desired play at the next throw of the game pieces or dice. The players will also note the stages of the game and limit the risk accordingly. The stage of the game and the positions of the base runners should be considered when attempting sacrifice hits. The most successful side in stealing bases and scoring sacrifice hits, whereby runs are made, will win in the majority of the games.

Having thus described my invention, I claim as new and desire to secure by Letters Patent:

1. In a game apparatus, two sets of coordinate game pieces, each game piece having its surfaces divided into a plurality of sides, each coördinate game piece having markings on its sides which differ from the markings on the other game pieces in the same set and which distinguish each set of game pieces from the other set of game pieces, and each set of coördinate game pieces having additional markings similar to the markings on the game pieces in the other set.

2. In a game apparatus, a set of game pieces, each game piece having its surface divided into a plurality of sides, each game piece having coördinate indicia on its sides similar to the coördinate indicia on the other game pieces in the set, each game piece having also additional coördinate indicia on some or all of its sides which distinguish the game piece from the other game pieces.

3. In a game apparatus, a series of sets of game pieces, each game piece having its surface divided into a plurality of sides with coördinate indicia on some of said sides, similar to the coördinate indicia on the other game pieces, each game piece in each set also having on its sides additional indicia different from the first mentioned coördinate indicia on the game pieces in the same set and which correspond with similar game pieces in the other sets.

4. In a game apparatus, a series of sets of game pieces, each game piece having its surface divided into a plurality of sides, each game piece of a set bearing coördinate indicia similar to the coördinate indicia on the other game pieces of its set, each game piece of a set being also differently marked on its sides from the other game pieces of its set, the last mentioned markings being similar on the corresponding game pieces of the different sets, coördinate indicia and markings making it possible to divide, classify and indicate a plurality of plays of a game and afford opportunities for other plays, substantially as set forth.

5. In a game apparatus, a set of game pieces, each game piece having its surface divided into a plurality of sides, coördinate indicia being indicated on some or all sides, the coördinate indicia comprising two divisions, primary and supplementary, each game piece of a set bearing similar coördinate supplementary indicia and each game piece bearing different coördinate primary indicia from the coördinate primary indicia of the other game pieces.

6. In a game apparatus, a series of sets of game pieces, each game piece having its playing surface divided into a plurality of sides, coördinate indicia being indicated on some or all of the sides, the coördinate indicia comprising two divisions primary and supplementary, each game piece of a set having similar coördinate supplementary indicia, each game piece of a set bearing different coördinate primary indicia which distinguishes it from the other game pieces of the same set, the arrangement of the coördinate supplementary indicia being different on each set of game pieces of a series and the coördinate primary indicia being substantially the same on similar game pieces in the different sets.

7. In a game apparatus, a series of sets of game pieces, each game piece having its surface divided into a plurality of sides, the game pieces of each set being classified into groups distinguishable from each other by the coördinate indicia, which correspond on similar game pieces in the different sets, there being additional coördinate indicia on the game pieces which distinguish each set from the remaining sets of game pieces.

8. A game apparatus including one or more sets of a series of sets of game pieces, each game piece having its playing surface divided into a plurality of sides, some or all of its sides bearing coördinate indicia thereon, the coördinate indicia comprising two divisions, primary and supplementary, the sides of each game piece of a set being differently classified from the sides of the other game pieces of its set by different coördinate indicia of the primary division, all the sides of a set of game pieces being separately classified into groups distinguished from each other, each of said groups comprising sets of sides, one of each game piece, all the sets of a group having a common or group coördinate indicia that is different for each group, some of said groups being additionally classified by similar coördinate indicia of the supplementary division, and each set of game pieces of a series of sets having more or less sides of one or more of its game pieces bearing similar coördinate indicia of the supplementary division than the sides of one or more of the same relative game pieces of each of the other sets of its series, substantially as set forth.

9. A game apparatus including one or more sets of a series of sets of game pieces, each game piece having its playing surface divided into a plurality of sides, some or all of its sides bearing coördinate indicia thereon, each set of game pieces comprising a divisional game piece by which the plays of a game are divided, a classifying game piece by which the plays are classified, and a resolvent game piece by which the plays are decided, all the game pieces of a set indicating by their coördination a plurality of plays of the game and opportunities for additional plays of the game, and each set of game pieces of a series of sets indicating the plays and opportunities for additional plays of the game in a relative ratio to each other in its set, that is different from the relative ratio of each of the other sets of its series substantially as set forth.

10. In a game apparatus, a set of game pieces, each game piece having a plurality of sides, the game pieces including a divisional game piece bearing on its sides marks indicating 1 and 3, a second and classifying game piece bearing on its sides the letter H and a mark indicating 1, and a third and resolvent game piece bearing on its sides the letter O, each of said game pieces bearing additional indicating lines.

11. In a game apparatus, a set of game pieces, each game piece having a plurality of sides, the game pieces including a divisional game piece bearing on its sides marks indicating 1 and 3, a second and classifying game piece bearing on its sides the letter H and a mark indicating 1, and a third and resolvent game piece bearing on its sides the letters O and B, each of said game pieces bearing additional indicating lines.

12. In a game apparatus, a set of game pieces, each of the game pieces having a plurality of sides, the game pieces including a divisional game piece bearing on its sides marks indicating 1 and 3, a second and classifying game piece bearing on its sides the letter H and a mark indicating 1, and having a plurality of blank sides, and a third and resolvent game piece bearing on its sides the letters O and B, each of said game pieces bearing additional indicating lines.

13. In a game apparatus, a series of sets of game pieces, the game pieces in each set having a plurality of sides and including a divisional game piece bearing on its sides marks indicating 1 and 3, a second and classifying game piece bearing on its sides the letter H and a mark indicating 1, and a third and resolvent game piece bearing on its sides the letter O, each of said game pieces bearing additional indicating lines which distinguish each set of game pieces from the other sets of game pieces.

RICHARD G. CLARKE.